Jan. 14, 1930. J. A. HALLANDER 1,743,887
FLYING MACHINE HAVING TWO OR MORE SUPPORTING PLANES
Filed Sept. 1, 1926
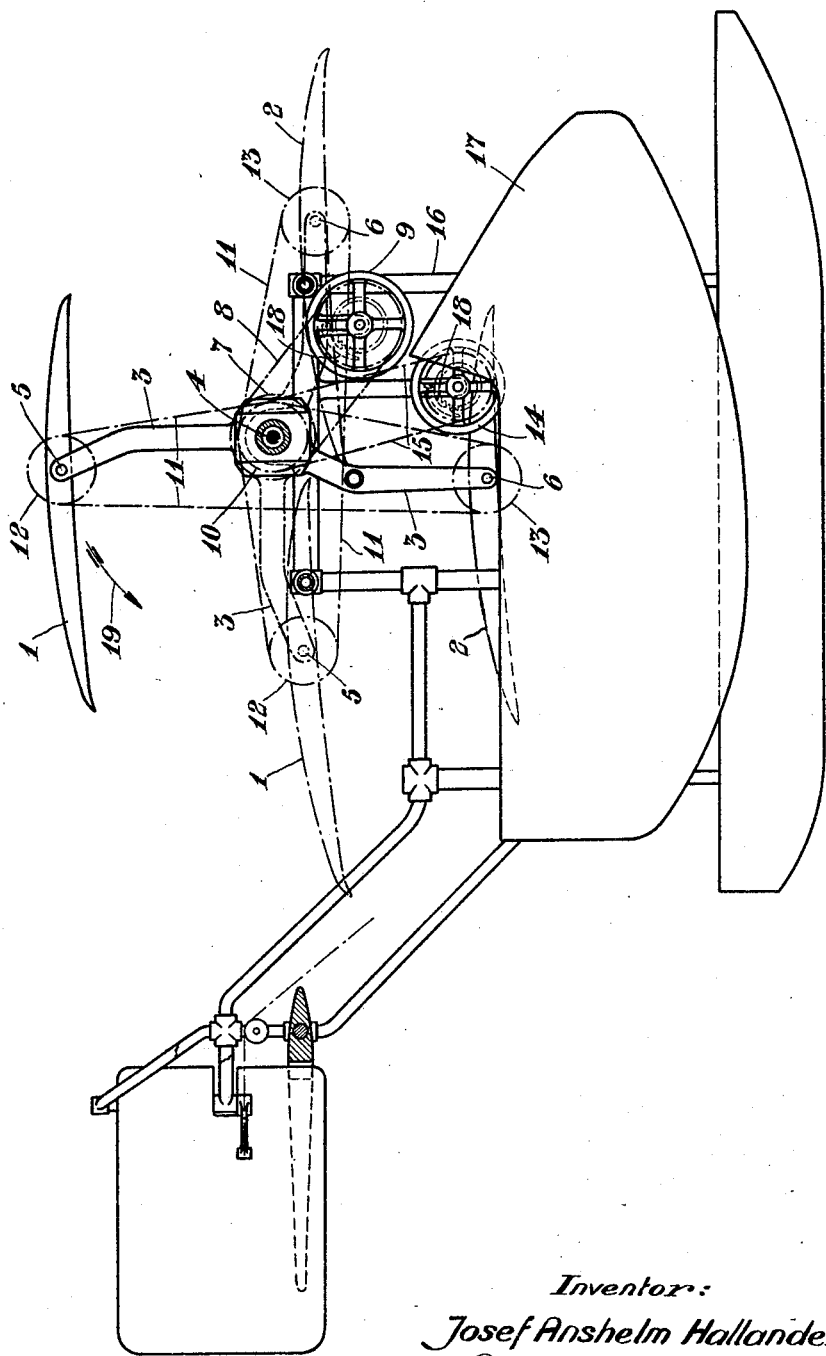
Inventor:
Josef Anshelm Hallander
by George Bayard Jones,
Attorney.

Patented Jan. 14, 1930

1,743,887

UNITED STATES PATENT OFFICE

JÖSEF ANSHELM HALLANDER, OF STOCKHOLM, SWEDEN

FLYING MACHINE HAVING TWO OR MORE SUPPORTING PLANES

Application filed September 1, 1926, Serial No. 132,946, and in Sweden September 19, 1925.

The present invention relates to an improvement in flying machines of the type which are provided with two or more supporting planes, and the invention has for its purpose to render possible such adjustment of said supporting planes that at an involuntary descent, for instance owing to engine trouble, said planes may to a certain extent act as a parachute decreasing the velocity of the fall. For this purpose the invention consists principally in that the supporting planes are mounted in a common frame or the like which is pivotally mounted in the flying machine frame, and that each supporting plane is rotatably journalled in said pivoted frame in such manner that it is capable of rotating around an axis which is parallel to the axis of rotation of the pivoted frame in the machine frame. By this arrangement the supporting planes may be positioned above and parallel to each other, which position they should as a rule occupy during the flight so that the machine will function as a double deck aeroplane, or a three deck aeroplane, and so forth, or the supporting planes may be positioned beside one another in or approximately in the same plane, preferably one behind the other taken in the direction of movement of the machine, in which position the supporting planes may serve as a parachute.

In the accompanying drawing an embodiment of the invention is illustrated by way of example. The drawing shows diagrammatically and in side view the arrangement of the supporting planes in a flying machine of the double deck type according to the invention.

The two supporting planes 1 and 2, or the two pairs of supporting planes in case two planes are used on each side of the flying machine body, as in the embodiment illustrated, are rotatably journalled in a frame 3 which in its turn is rotatably journalled in the flying machine frame 16, in such manner that the first named frame is rotatable around the horizontal shaft 4 which is perpendicular to the normal direction of movement of the flying machine, from left to right in the drawing. The supporting planes 1 and 2 are rotatable on shafts 5 and 6, respectively, which are secured to or journalled in the frame 3, and which are parallel to the axis of rotation 4 of said frame and are located approximately at or slightly in front of the centres of the supporting planes. To the frame 3 a chain sprocket wheel 7 is rigidly secured which wheel is connected by means of an endless chain 8 or the like to a hand wheel 9 journalled in the machine frame 16 near the drivers seat in the car 17, so that by turning said hand wheel 9 the driver can turn the pivoted frame 3 around the shaft 4 in one direction or the other. A chain sprocket wheel 10 is rotatably mounted on said shaft 4 and is connected by means of an endless chain 11 to two chain sprocket wheels 12 and 13 of the same size as the wheel 10 and rigidly secured to the planes 1 and 2, respectively, in such manner that by turning said wheel 10 the supporting planes 1 and 2 may be caused to turn on their shafts 5 and 6, respectively. Such turning may be effected by means of a second hand wheel 14 rotatably mounted in the machine frame 16 and connected by means of an endless chain 15 to a chain sprocket wheel placed beside and rigidly secured to the chain sprocket wheel 10. The hand wheels 9 and 14 are provided with pawl devices 18 by means of which they may be locked in their adjusted positions.

During the flight the supporting planes normally occupy the positions one above the other shown in full-drawn lines in the drawing, so that the machine functions as a double deck aeroplane. By turning the hand wheel 14, while the hand wheel 9 is locked, the supporting planes 1 and 2 may be rotated in one direction or the other around their shafts 5 and 6, so that said planes serve as horizontal rudders. The usual rear horizontal rudder may therefore be rigidly secured to the flying machine body. Again, if the hand wheel 9 is turned, while the hand wheel 14 is locked, the entire frame 3 is rotated around the shaft 4, for instance in the direction indicated by the arrow 19. Owing to the chain sprocket wheel 10 connected to the hand wheel 14 being locked the supporting planes 1 and 2 will simultaneously be rotated around their shafts 5 and 6 in the clockwise direction relatively to the frame 3, so that during the entire rotation they retain their horizontal positions, or retain the same inclination as in the initial positions, that is to say move all the time parallelly to themselves. When the frame 3 has been turned in the said direction through a quarter of a revolution, the supporting planes and the frame occupy the positions shown in dotted and dashed lines in the drawing, and the supporting planes can then serve as a parachute. Finally, if the hand wheel 9 is turned while the hand wheel 14 is free to rotate, the frame 3 will be turned around the shaft 4 while the supporting planes 1 and 2 remain motionless relatively to said frame. After turning the frame through a quarter of a revolution the supporting planes will then stand vertically. The possibility of adjusting the supporting planes in this manner may be advantageous, for instance in helicopters during the rise and descent of which the supporting planes will in such case serve as balancing surfaces.

The embodiment above described and illustrated in the drawing is only to be regarded as an example, and it will be obvious that the details of the same may be modified in several ways without departing from the principle of the invention.

I claim:

1. In a flying machine, the combination of a flying machine frame, a second frame pivotally mounted in said machine frame on an axis substantially transverse to the same, and at least two supporting planes each of which is rotatably mounted in said pivoted frame so as to be rotatable on an axis parallel to the axis of rotation of said pivoted frame in said machine frame, and all of said supporting planes having their axes of rotation lying substantially in one and the same plane through the axis of rotation of said pivoted frame in said machine frame, and means for adjusting all of said supporting planes above and parallel to each other as well as beside each other in substantially the same plane through the axis of rotation of said pivoted frame.

2. In a flying machine, the combination of a flying machine frame, a second frame pivotally mounted in said machine frame on an axis substantially transverse to the same, and one group of supporting planes on each side of the machine frame, each group comprising at least two supporting planes each of which is rotatably mounted in said pivoted frame so as to be rotatable on an axis parallel to the axis of rotation of said pivoted frame in said machine frame, and all of said supporting frames of each group having their axes of rotation lying substantially in one and the same plane through the axis of rotation of said pivoted frame in said machine frame, and means for adjusting all of said supporting planes of each group above and parallel to each other as well as beside each other in substantially the same plane through the axis of rotation of said pivoted frame.

3. In a flying machine, the combination of a flying machine frame, a second frame pivotally mounted in said machine frame on an axis substantially transverse to the same, one group of supporting planes on each side of the machine frame, each group comprising at least two supporting planes each of which is rotatably mounted in said pivoted frame so as to be rotatable on an axis parallel to the axis of rotation of said pivoted frame in said machine frame, and all of said supporting planes of each group having their axes of rotation lying substantially in one and the same plane through the axis of rotation of said pivoted frame in said machine frame, so that all of said supporting planes of each group may be adjusted above and parallel to each other as well as beside each other in substantially the same plane through the axis of rotation of said pivoted frame, and means associated with each of said groups for simultaneous adjustment of the supporting planes of such group relatively to the pivoted frame independently of the planes of the other group.

4. In a flying machine, the combination of a flying machine frame, a second frame pivotally mounted in said machine frame, at least two supporting planes each of which is rotatably mounted in said pivoted frame in such manner that it is rotatable on an axis which is parallel to the axis of rotation of said pivoted frame in said machine frame, so that the supporting planes may be adjusted above and parallel to each other as well as beside each other in substantially the same plane, a hand wheel rotatably mounted in said machine frame, means for locking said hand wheel, and a chain and sprocket wheel connection between said hand wheel and said supporting planes adapted upon rotation of said pivoted frame relatively to said machine frame to cause said supporting planes to move parallelly to themselves when the said hand wheel is locked.

JOSEF ANSHELM HALLANDER.